United States Patent
Allen et al.

(10) Patent No.: US 8,056,202 B2
(45) Date of Patent: Nov. 15, 2011

(54) TIRE REPLACEMENT SYSTEM FOR COMPACT TRACTOR

(75) Inventors: Kenneth L. Allen, Des Moines, IA (US); Jeffery L. Wilson, Ankeny, IA (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1602 days.

(21) Appl. No.: 11/412,710

(22) Filed: Apr. 27, 2006

(65) Prior Publication Data

US 2009/0077806 A1   Mar. 26, 2009

(51) Int. Cl.
B23P 23/00    (2006.01)
B60C 11/00    (2006.01)

(52) U.S. Cl. .............. 29/401.1; 29/402.08; 29/402.09; 152/209.12; 180/900

(58) Field of Classification Search .............. 29/401.1, 29/402.08, 402.09; 280/43; 180/900; 152/379.3, 152/380, 209.12, 209.1, 209.3
See application file for complete search history.

(56) References Cited

U.S. PATENT DOCUMENTS

| | | | | |
|---|---|---|---|---|
| 1,577,158 A * | 3/1926 | Barber | ............... | 301/22 |
| 1,788,862 A * | 1/1931 | Darrow | ............... | 301/10.1 |
| 2,486,970 A | 11/1946 | Nordenson | ............... | 301/9 |
| 2,600,231 A | 6/1952 | Ewart | ............... | 152/209.1 |
| 2,614,603 A * | 10/1952 | Howley | ............... | 152/404 |
| 2,811,368 A | 11/1955 | Clausen | ............... | 280/43 |
| 2,797,722 A * | 7/1957 | Carroll et al. | ............... | 152/404 |
| 3,143,157 A * | 8/1964 | Robson et al. | ............... | 152/411 |
| 3,145,755 A * | 8/1964 | Turner | ............... | 152/401 |
| 3,463,213 A * | 8/1969 | Wade | ............... | 152/409 |
| 3,532,383 A * | 10/1970 | Unverferth et al. | ............... | 301/9.2 |
| 3,614,969 A * | 10/1971 | Breiner | ............... | 157/16 |
| 3,627,072 A * | 12/1971 | Smirl | ............... | 180/249 |
| 3,838,725 A | 10/1974 | Lejeune | ............... | 152/209 |
| 4,202,391 A | 5/1980 | Shibayama et al. | ............... | 152/209 |
| 4,373,567 A * | 2/1983 | Declercq | ............... | 152/405 |
| 4,574,857 A | 3/1986 | Beeghly et al. | ............... | 152/209 |
| 4,709,739 A * | 12/1987 | Ruscelli et al. | ............... | 152/453 |
| 5,046,579 A | 9/1991 | Anderson | ............... | 180/340 |
| 5,492,390 A | 2/1996 | Kugelmann, Sr. | ............... | 301/5.1 |
| 5,944,082 A | 8/1999 | Thompson et al. | ............... | 152/209.8 |
| 6,033,334 A * | 3/2000 | Showalter | ............... | 475/206 |
| 6,068,350 A * | 5/2000 | Baumgarten et al. | ............... | 301/64.102 |
| 6,263,933 B1 | 7/2001 | Baus | ............... | 152/209.12 |

(Continued)

FOREIGN PATENT DOCUMENTS

EP    0 227 575    7/1987

(Continued)

OTHER PUBLICATIONS

Galaxy tire system as described at paragraph [0006] of specification.
Printout from website www.titanstore.com.
Printout from website www.gpxtire.com.
Printout from website www.compactequip.com entitled Hot Wheels The Industry's Most Popular Tire Options for Skid Steers, Compact Tractors and Compact Utility Loaders.

*Primary Examiner* — Essama Omgba

(57) ABSTRACT

A system is provided for refitting a tire system on a compact tractor which typically comes equipped with a set of industrial tires mounted on standard industrial size wheels. A set of replacement agricultural tires or turf tires is provided. The replacement tires are sized to fit on the standard industrial size wheels while having rolling circumferences substantially equal to rolling circumferences of standard agricultural tires or turf tires, respectively, for the compact tractor in question. The industrial tires are replaced with the replacement agricultural tires or turf tires without changing at least the front wheels on the compact tractor.

8 Claims, 1 Drawing Sheet

U.S. PATENT DOCUMENTS

| | | | |
|---|---|---|---|
| 6,273,515 B1 | 8/2001 | Taylor | 301/9.2 |
| 6,382,284 B1 | 5/2002 | Bonko | 152/209.8 |
| 6,899,345 B1 * | 5/2005 | Bearden | 280/43 |
| 7,044,251 B2 | 5/2006 | Mast | 180/209 |
| 7,090,735 B2 | 8/2006 | Neugebauer et al. | 156/110.1 |
| 7,284,630 B2 * | 10/2007 | Bryan | 180/198 |
| 2005/0225105 A1 | 10/2005 | Meyer | 295/8.5 |
| 2006/0243371 A1 * | 11/2006 | Kanenari | 156/123 |
| 2008/0073969 A1 * | 3/2008 | Baird | 301/110.5 |

FOREIGN PATENT DOCUMENTS

| | | |
|---|---|---|
| EP | 0 277 903 | 10/1988 |
| JP | 05131463 A * | 5/1993 |

\* cited by examiner

TIRE REPLACEMENT SYSTEM FOR COMPACT TRACTOR

BACKGROUND OF THE INVENTION

1. Field of the Invention

The present invention relates generally to systems for the replacement of tires on a compact tractor, and more particularly, but not by way of limitation, to a system for replacing standard industrial size tires with either standard agricultural size tires or standard turf size tires without changing the wheels upon which the tires are mounted.

2. Description of the Prior Art

Compact tractors are traditionally understood to be tractors having an engine of under 40 horsepower or sometimes up to about 50 horsepower and with a power takeoff on the tractor. The horsepower rating generally differentiates compact tractors from full size tractors, and the presence of the power takeoff generally differentiates compact tractors from lawn tractors.

Up until about 1993 most of the compact tractors sold in the United States were imported from Japan. Traditionally the compact tractor had been a very popular farm tractor in Japan where the farms are much smaller than they are in the United States. In the United States market, lawn tractors are very popular with large property owners who are not involved in full scale farming operations but who have substantial need for mowing, tilling of soil, and hauling. In about 1993 American tractor manufacturers began to assemble compact tractors in the United States. Three types of tire tread patterns have historically been available for compact tractors. These are industrial tires, agricultural tires, and turf tires. Historically, each of the three types of tires, industrial, agricultural and turf, have been designed for use with different wheel sizes which for one reason or another had previously been introduced with that type of tire.

Thus, it is typical for a specific compact tractor from a specific manufacturer that the industrial tires, agricultural tires, and turf tires which are specified for use with that tractor all are specified for use on different size wheel rims. Accordingly, when a customer wishes to change the type of tires on their tractor, it is also generally necessary for them to purchase a new set of wheels upon which to mount those tires.

To date, the only solution which has been proposed to avoid the need to replace wheels when changing the type of tire used on a compact tractor has been a system sold by Galaxy which simply put a turf tread pattern on a standard industrial size tire. That approach does not take into account the fact that for a given tractor, a tire with a turf style tread preferably has a different rolling circumference than does a tire with an industrial tread or an agricultural tread. Thus certain accessories which have been designed by other manufacturers for use with turf tires may not fit on a tractor equipped with the Galaxy turf tires.

Accordingly, there is a continuing need for a better solution to the expensive and time consuming task presently faced by most compact owners of purchasing an entire new wheel and tire system when they desire to change from their original equipment industrial style tires to either agricultural tires or turf tires.

SUMMARY OF THE INVENTION

The present invention provides a system for replacing the industrial tires on a compact tractor with either agricultural tires or turf tires without changing the wheels of the tractor. More particularly, the system is for a tractor designed for use selectively with standard industrial size tires on standard industrial size wheels, standard agricultural size tires on standard agricultural size wheels and standard turf size tires on standard turf size wheels, at least some of said standard agricultural size wheels and said standard turf size wheels being different in size from said standard industrial size wheels, and at least some of said standard agricultural size tires and standard turf size tires having rolling circumferences different from said standard industrial size tires. The methods of this system comprise:

(a) providing a compact tractor equipped with a set of standard industrial size tires mounted on standard industrial size wheels;

(b) providing a set of replacement tires selected from the group consisting of replacement agricultural tires and replacement turf tires, said replacement agricultural tires having rolling circumferences substantially equal to the rolling circumferences of the standard agricultural size tires, and said replacement turf tires having rolling circumferences substantially equal to the rolling circumferences of the standard turf size tires;

(c) removing at least the two front standard industrial size tires, and preferably all of the standard industrial size tires, from the standard industrial size wheels; and (d) mounting at least the two front replacement agricultural or turf tires on the standard industrial size wheels, thereby converting the tractor from industrial tires to agricultural or turf tires without replacing the two front standard industrial size wheels, and preferably without replacing any of the standard industrial size wheels.

In another aspect of the invention the set of replacement tires includes two front replacement tires and two rear replacement tires having rolling circumferences such that a front tire overspeed range for the tractor with the set of replacement tires installed is maintained within a front tire overspeed range specified by the manufacturer of the tractor.

In another aspect of the invention a set of replacement agricultural or turf tires is provided for a compact tractor. The set of replacement tires includes two front replacement tires and two rear replacement tires, all having a tread type selected from the group consisting of agricultural and turf treads, said replacement tires having rolling circumferences substantially equal to the rolling circumferences of standard agricultural or turf size tires, respectively.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
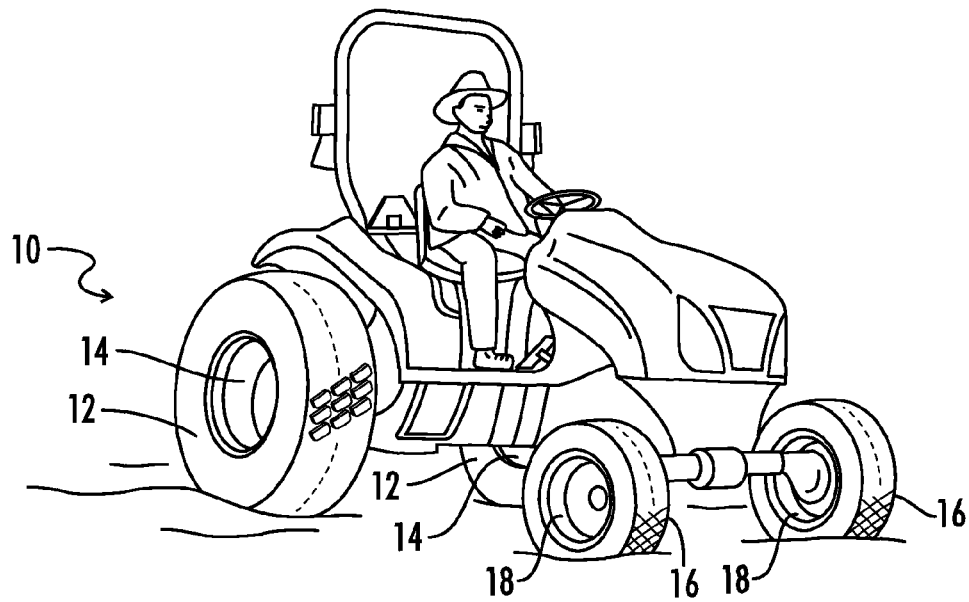
FIG. 1 is a side elevation view of a compact tractor.

FIG. 1 shows a typical compact tractor 10. The tractor 10 has two rear tires 12 mounted on rear wheels 14 and two front tires 16 mounted on two front wheels 18.

The tractor may be rear wheel driven or it may be four wheel driven. In the case of four wheel drive tractors the manufacturer will specify a mechanical ratio for the tractor.

The mechanical ratio is the number of times the front axle rotates for each rotation of the rear axle. A typical mechanical ratio for a compact tractor is about 1.60. Additionally, the tractor manufacturer will specify an acceptable range of front tire overspeed for each tractor. Generally it is desired that the front tires be driven slightly faster than the rear tires, typically in a range of from 1% to about 5% front tire overspeed. But each manufacturer will specify its own range, which in a few cases will even have a lower end slightly less than zero. A factor which goes into the determination of the actual overspeed is the rolling circumference of the tire. The rolling circumference can be defined as the distance a tire travels in one revolution. The rolling circumference of a tire is not exactly equal to the free circumference that the tire would have when it is not under load. The rolling circumference is slightly smaller than the free circumference, and is typically estimated as 0.97 multiplied by the free circumference of the tire. When changing the tires on a compact tractor, particularly one having four wheel drive, it is important to select the tire rolling circumferences so as to maintain a front tire overspeed within range specified by the manufacturer of the tractor.

Figure 2:
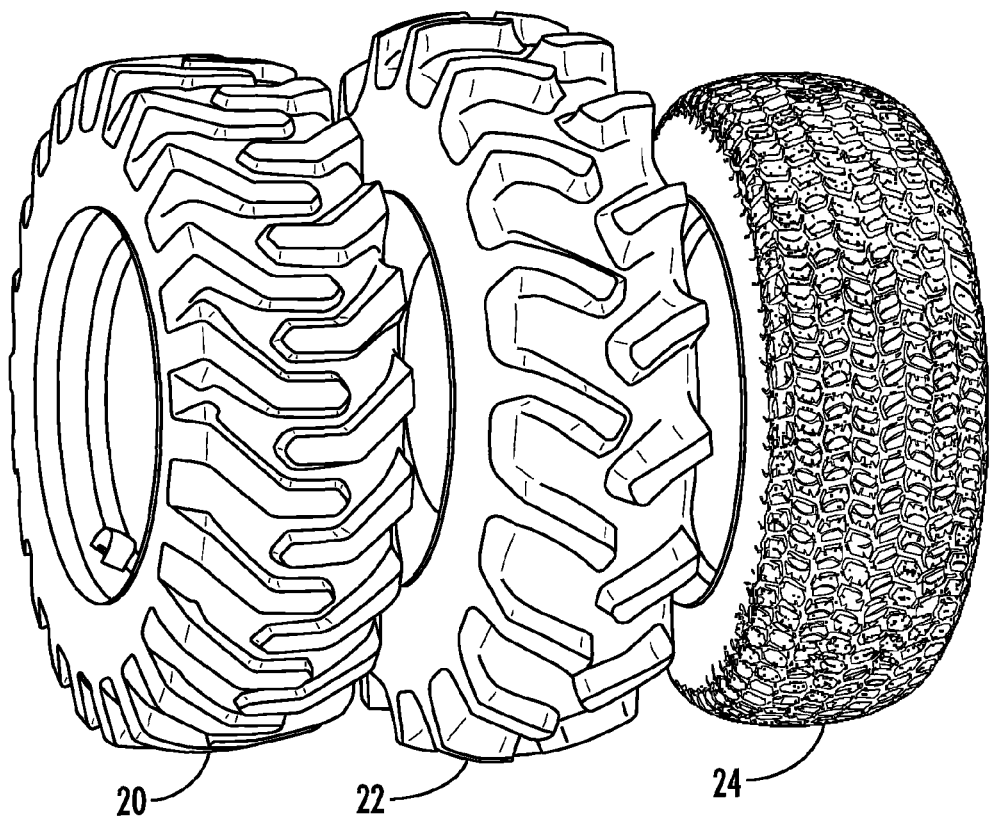
FIG. 2 is a perspective view showing side by side a representative standard industrial size tire on a standard industrial size wheel, a replacement agricultural tire mounted on a standard industrial size wheel, and a replacement turf style tire mounted on a standard industrial size rim or wheel.

Over the years, as the compact tractor market has evolved, three general types of tread patterns have been developed for different types of use of the tractor. These are industrial treads, agricultural treads, and turf treads. FIG. 2 illustrates perspective views of three tires side by side, including on the left side of FIG. 2 a tire 20 having industrial treads, in the center of FIG. 2 a tire 22 having agricultural treads, and on the right hand side of FIG. 2 a tire 24 having turf treads.

The most extreme tread pattern is that of the agricultural tire 22 which has very large lugs separated by wide deep spaces which allow the tire to dig deeply into soft or wet earth such as is encountered in plowing a field or the like.

At the other extreme is the turf tire 24 which has very small closely spaced lugs with flat outer surfaces suitable for use on a lawn or other ground surface where it is desirable not to have the tire to sink into or damage the ground surface.

Somewhat of an intermediate tread pattern is found in the industrial tire 20 which has larger treads more like the agricultural tire, but much shallower and more closely spaced so as to provide some of the same properties of a turf tire and being more suitable for use on pavement or hard surfaces while still providing substantial traction in softer surfaces.

Additionally, for a given tractor, these three different types of tires have traditionally had different overall sizes, particularly rolling circumference, most suitable to the types of usages associated with each tread type. In general the agricultural tires have been the largest, with the industrial tires being an intermediate size and the turf tires being the smallest.

As the compact tractor industry has evolved since 1993 it has become most common to sell new compact tractors with industrial tread tires and wheels which are traditionally sized for those industrial tires. Thus, if a customer wishes to change the tire style of their tractor they typically have to remove the original wheels with their industrial size tires and purchase and install a complete new set of wheels and tires to convert to either agricultural or turf tires.

Within the compact tractor family, there are traditionally several sizes of compact tractors. Although these are sometimes given different designations by different manufacturers, they are traditionally referred to as extra large frame, large frame, mid frame or small frame compact tractors. Tractors within each of these size categories tend to use similar size tires.

This frame size classification corresponds for example to a numerical system utilized by Case New Holland where classes 1, 2, 3 and 4 are used. Class 1 is the equivalent of a small frame. Class 2 is the equivalent of a mid-frame. Class 3 is the equivalent of a large frame. Class 4 is the equivalent of an extra large frame.

Thus, the situation has arisen that a given compact tractor can be described as being designed for use selectively with standard industrial size tires on standard industrial size wheels, standard agricultural size tires on standard agricultural size wheels, and standard turf size tires on standard turf size wheels. For a given compact tractor, at least some of said standard agricultural size wheels and said standard turf size wheels are different in size from said standard industrial size wheels. Also, at least some of said standard agricultural size tires and said standard turf size tires have rolling circumferences different from said standard industrial size tires. This has led to a situation where when an owner wishes to change the type of tire tread used on a tractor, it is usually necessary to buy both a complete new set of four tires and a complete new set of four wheels.

The present invention provides a system which solves this problem. The present invention is particularly adapted for conversion of a compact tractor from industrial tires to either agricultural or turf tires. This direction of conversion has been selected because approximately two-thirds of compact tractors sold since 1993 in the United States have been equipped with industrial tires as original equipment.

The solution comes by way of a set of replacement agricultural or turf tires including two front replacement tires and two rear replacement tires, all having either an agricultural or turf tread type, with said replacement tires having rolling circumferences substantially equal to the rolling circumferences of the standard agricultural or turf size tires, respectively. These replacement tires additionally are constructed so as to fit on standard industrial size wheels for the tractor in question. Thus the tire type can be changed without changing the wheels, and the resulting tire and wheel assembly will have a rolling circumference comparable to that traditionally used for either agricultural or turf type tires for the tractor in question. Preferably both the front and rear replacement tires are sized to fit on standard industrial size wheels. However, as will be seen in the examples described in Tables I and II below this is not always possible, especially with replacement agricultural tires. In those two examples the rear replacement agricultural tires continue to require replacement of at least part of the rear wheels.

This system provides a method for replacing tires which includes the steps of:

(a) providing a compact tractor equipped with a set of standard industrial size tires mounted on standard industrial size wheels;

(b) providing a set of replacement tires selected from the group consisting of replacement agricultural tires and replacement turf tires, said replacement agricultural tires having rolling circumferences substantially equal to the rolling circumferences of standard agricultural size tires, and said replacement turf tires having rolling circumferences substantially equal to the rolling circumferences of standard turf size tires;

(c) removing at least the two front standard industrial size tires, and preferably all of the standard industrial size tires from the standard industrial size wheels; and (d) mounting at least the two front replacement agricultural or turf tires on the standard industrial size wheels, thereby converting the tractor from industrial tires to agricultural or turf tires without replacing the two front standard industrial size wheels, and preferably without replacing any of the standard industrial size wheels.

In those cases where the compact tractor is a four wheel drive tractor, the set of replacement tires includes two front replacement tires and two rear replacement tires having rolling circumferences such that the front tire overspeed for the tractor with the set of replacement tires installed is maintained within a manufacturer specified front tire overspeed range, typically from about 1% to about 5%.

This system has also been designed so as to reduce the number of tire sizes required to be maintained available by a dealer in order to provide such conversion for the vast majority of compact tractors on the market. This has been done by designing a set of replacement tires which is satisfactory for all of the major compact tractor brands which fall within an industry classification such as extra large frame, large frame, mid frame and small frame. For example, the set of replacement tires described in the following Table I and Table II for Large/Extra-Large and for Mid-Frame compact tractors, respectively, is designed for use with John Deere (JD), Case New Holland (CNH), Kuboto (Kub), and Massey Ferguson (AGCO) brands.

The following Table I details both the standard and new tire sizes for Large/Extra-Large frame compact tractors. The standard tire sizes listed are those which would be described as the current standard industrial size tire on standard industrial size wheels, the current standard turf size tires on standard turf size wheels, and the current standard agricultural size tires on agricultural size wheels.

O.D. in inches, the rolling circumference (R.C.) of the tire and the various tractor models for which the tires in question are designed.

First displayed in Table I are the specifications for the standard industrial size tires which are also referred to as R4 tires. The first two rows designate the standard or current tire sizes for the rear and front tires respectively. The second two rows show the new tire sizes. Since the industrial size wheel has been selected as the common wheel size for use with the replacement tire system, the new tire sizes for the industrial tire are the same as the standard tire sizes.

In the center of Table I are the standard and new tire sizes for the turf or R3 tires. The first three rows for the turf tires are the standard tire sizes. The first row being a rear tire size and the second and third rows being two optional front tire sizes.

The next three rows of information for the turf tires are the new tire information showing a new rear tire and two new front tires corresponding to the first, second and third rows, respectively of turf tire information.

The bottom third of Table I shows information for the agricultural or R1 style tires. The first three rows show information for a standard rear tire and for two optional front tire sizes. The last two rows show the information for the new rear tire and the new front tire. As previously noted, in this case the replacement rear agricultural tire is the same as the standard rear agricultural tire and the rear wheels (or at least part thereof in the case of eight-point mounting wheels) will have to be replaced. In other cases where it is possible to re-

TABLE I

Standard and New Tire Sizes for Large/Extra-Large Frame Compact Tractors

| Tread Type | | Tire Size | Front or Rear | Wheel Dia. | Tire Width | Tire O.D. | R.C. | For Tractor Models |
|---|---|---|---|---|---|---|---|---|
| R4 | STD | 17.5L-24 | R | 24 | 17.5 | 48.9 | 145 | AGCO 1455, 1165; |
| IND | | 10-16.5 | F | 16.5 | 10.4 | 31.3 | 91 | CNH 35, 40, 45; JD |
| | NEW | 17.5L-24 | R | 24 | 17.5 | 48.9 | 145 | 45xx, 46xx, 47xx; |
| | | 10-16.5 | F | 16.5 | 10.4 | 31.3 | 91 | KUB 3710, L48, L3830, L4330, L4630, L5030 |
| R3 | STD | 44 × 18.00-20 | R | 20 | 18.6 | 44.6 | 129 | Rear: KUB B7400; JD |
| TURF | | 27 × 10.50-15 | F | 15 | 10.2 | 26.9 | 80 | 4010; CNH 18, 21; |
| | | 29 × 12.50-15 | F | 15 | 12.5 | 29.4 | 88 | AGCO 1413, 1417 |
| | NEW | 460/60D24 | R | 24 | 18.1 | | 135 | |
| | | 265/55D16.5 | F | 16.5 | 10.4 | | 84 | |
| | | 320/55D16.5 | F | 16.5 | 12.6 | | 89 | |
| R1 | STD | 13.6/14.9-24/28 | R | 24/28 | | | | Rear: KUB B7500, |
| AG | | 8-16 | F | 16 | | | | B2410; JD4110; CNH |
| | | 9.5-16 | F | 16 | 9.5 | 33 | 100 | 18, 21; AGCO 1413, |
| | NEW | 13.6/14.9-24/28 | R | 24/28 | | | | 1417H |
| | | 250/85D16.5 | F | 16.5 | 9.8 | | 98 | |

The new tires listed in Table I for the turf type tires and agricultural tires are the replacement turf and agricultural size tires, respectively, having rolling circumferences substantially equal to those of the standard turf and agricultural tires, respectively, while being designed to be mounted on the standard industrial size wheels. The "new" industrial size tires listed are identical to the standard industrial size tires. Also it is noted that in this case the "new" rear agricultural tires are identical to the standard rear agricultural tires.

Across the top row of Table I is an identification of the information in the table, beginning with tread type, tire size, a designation of whether the tire is for the front or rear of the tractor, the Wheel Diameter in inches, the Tire Width which is the maximum inflated tire section width in inches, the Tire engineer a replacement rear agricultural tire to fit on the standard rear industrial wheels, that should be done.

Thus Table I provides information for the standard industrial size tires, standard turf size tires and standard agricultural size tires for use on large/Extra-Large frame compact tractors. Additionally, Table I provides the information for the new or replacement turf tires and for the new or replacement agricultural tires which can be mounted upon the standard industrial size wheels.

Now looking in detail at the information across Table I from left to right, and using for example the new rear turf size tire, that tire has a tire size of 460/60D24. It is a rear tire as indicated by the R in the fourth column. It has a wheel diameter of 24 inches as indicated in the fifth column. It has a Tire Width of 18.1 inches as indicated by the sixth column. It has a rolling circumference of 135 inches as indicated in the eighth column. And it is suitable for use on Kuboto Model B7400; John Deere Model 4010; Case New Holland Models 18 and 21; and AGCO Models 1413 and 1417. Similar information is provided for the other standard and new industrial, turf and agricultural tires in Table I.

The tire sizes presented in the tables are in standard format. For example, a format of the style 460/60D24 is interpreted as follows. The 460 is the tire width in mm. The 60 is the aspect ratio which is the ratio of sidewall height as a percentage of tire width. The D designates a diagonally biased tire construction. The 24 represents the wheel diameter in inches.

Similarly a tire size such as 44×18.00-20 is interpreted as a 44 inch nominal tire outside diameter, with an 18 inch nominal tire section width, for a 20 inch diameter wheel. A tire size of 17.5L-24 is interpreted as a 17.5 inch nominal tire section width, with an "L" or "lower" profile, for a 24 inch diameter wheel. A tire size of 10-16.5 is interpreted as a 10 inch nominal tire section width for a 16.5 inch diameter wheel.

The following Table II provides similar information in a similar format for the standard and new tire sizes for use with mid-frame compact tractors. In this case the information provided is for tires for AGCO, Case New Holland, John Deere and Kubota models. Once again the rear replacement agricultural tire is the same as the rear standard agricultural tire, so the rear wheels will have to be at least partially replaced to change to agricultural tires.

the calculation, for example, for the John Deere 4300 series and 4400 series tractors, the John Deere company specifies a mechanical ratio of 1.616 for those tractors. For the low end of the manufacturer specified front wheel overspeed range a minimum front wheel rolling circumference of 76.3 inches is calculated. For the high end of the manufacturer specified front wheel overspeed range a maximum front wheel rolling circumference of 79.3 inches is calculated. Similar calculations are carried out for the other three manufacturers. Then, as shown in the lower right portion of Table III, we must select the largest of the minimum sizes for the four manufacturers, which is designated as the "Max Min" which in this case is 76.8 inches for the Case New Holland tractor. Similarly, from the right hand column we must select the smallest of the maximum rolling circumferences which is designated at "Min Max" and in this case is 78.3 inches which is provided by the Kuboto tractor. Thus, any front tire having a rolling circumference between 76.8 inches and 78.3 inches will provide a front tire overspeed in the tractor manufacturer specified ranges for all four of the tractors represented in Table III. Thus, as shown in Table II a new replacement front tire size of 215/65D14 was selected which has a rolling circumference of 77 inches which falls between the Max Min and the Min Max of Table III.

TABLE II

Standard and New Tire Sizes for Mid-Frame Compact Tractors

| Tread Type | | Tire Size | Front or Rear | Wheel Dia. | Tire Width | Tire O.D. | R.C. | For Tractor Models |
|---|---|---|---|---|---|---|---|---|
| R4 | STD | 15-19.5 | R | 19.5 | 15.7 | 40.8 | 122 | AGCO 1260, 1440; |
| IND | | 25 × 8.50-14 | F | 14 | 8.4 | 25.8 | 77 | 1240, 1429; CNH |
| | NEW | 15-19.5 | R | 19.5 | 15.7 | 40.8 | 122 | 29, 33; JD 43xx, 44xx; |
| | | 215/65D14 | F | 14 | 8.5 | 25.8e | 77 | KUB L2600, L3000 |
| R3 | STD | 41 × 14.00-20 | R | 20 | 14.0 | 42.0 | 122 | |
| TURF | | 27 × 8.50-15 | F | 15 | 8.5 | 26.6 | 79 | |
| | NEW | 380/70D19.5 | R | 19.5 | 14.9 | 40.8e | 122 | |
| | | 215/65D14 | F | 14 | 8.5 | 25.8e | 77 | |
| R1 | STD | 11.2-24 | R | 24 | | | | |
| AG | | 7-14 | F | 14 | 6.8 | 27.2 | 81 | |
| | NEW | 11.2-24 | R | 24 | | | | |
| | | 200/85D14 | F | 14 | 7.9 | | 82 | |

As previously noted, the tire system of the present invention has been designed so as to minimize as much as is reasonably possible the number of different sizes of tires which must be stocked. The following is an explanation of how this has been accomplished by taking into account the mechanical ratios for the various major tractor brands and also looking at the manufacturer specified ranges of acceptable lead or overspeed percentages for the front wheels. For example, looking at the information from Table II for mid-frame tractors, the calculations are shown for determining an acceptable size for the replacement turf tires. The calculation began with the assumption that the rear tire would have a 122 inch rolling circumference as provided by the new 380/70D19.5 tires specified in Table II.

Then as shown in the following Table III, the mechanical ratios for the four major manufacturers were taken into account as the manufacturer specified front tire overspeed percentage ranges. These four manufacturers comprise approximately 95% of the compact tractor market. Running

TABLE III

Sample Calculation of Tire Sizes to Maintain Mechanical Ratio for New Mid-Frame Turf Tires

| | | REAR 122 FRONT RC RANGE | |
|---|---|---|---|
| RC OF SELECTED MATCH | | | |
| MANUFACTURER | MECH RATIO | MIN | MAX |
| AGCO | 1.607 | 76.7 | 79.7 |
| CNH | 1.589 | 76.8 | 80.6 |
| KUBOTA 1 | 1.636 | 74.6 | 78.3 |
| DEERE | 1.616 | 76.3 | 79.3 |
| | | Max Min: 76.8 | Min Max: 78.3 |

Similar calculations are carried out for the other replacement tire sets so as to select a tire size that will be suitable for use on all of the major manufacturers' tractors which fall within the mid-frame category.

Accordingly, it is an advantage of the present invention to provide improved methods and apparatus for replacing the tires on a compact tractor.

Another advantage of the present invention is the provision of replacement agricultural tires or turf tires for a compact tractor which can be mounted on the same rims which would be originally supplied with the compact tractor for industrial size tires.

Still another advantage of the present invention is the provision of replacement agricultural or turf style tires for a compact tractor which maintain the traditional rolling circumference for standard agricultural or turf size tires, respectively.

Still another advantage of the present invention is the provision of a set of replacement tires for a compact tractor including front and rear tires having rolling circumferences such that a front tire overspeed is maintained within a selected range.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and sequence of the parts and steps may be made by those skilled in the art, which changes are encompassed within the scope and spirit of the present invention as defined by the appended claims.

What is claimed is:

1. A method of replacing a tire system on a compact tractor, said tractor being designed for use selectively with standard industrial size tires on standard industrial size wheel rims, standard agricultural size tires on standard a agricultural size wheel rims and standard turf size tires on standard turf size wheel rims, at least some of said standard agricultural size wheel rims and said standard turf size wheel rims being different in size from said standard industrial size wheel rims, and at least some of said standard agricultural size tires and said standard turf size tires having rolling circumferences different from said standard industrial size tires, said method comprising:
    (a) providing a compact tractor equipped with a set of two front and two rear standard industrial size tires mounted on two front and two rear standard industrial size wheel rims;
    (b) providing a set of replacement tires sized to fit on standard industrial size wheel rims, said set of replacement tires selected from the group consisting of replacement agricultural tires and replacement turf tires, said replacement agricultural tires having rolling circumferences substantially equal to the rolling circumferences of the standard agricultural size tires, and said replacement turf tires having rolling circumferences substantially equal to the rolling circumferences of the standard turf size tires;
    (c) removing at least the two front standard industrial size tires from the two front standard industrial size wheel rims; and
    (d) mounting at least the two front replacement agricultural or turf tires on the two front standard industrial size wheel rims, thereby converting the tractor from industrial tires to agricultural or turf tires without replacing the two front standard industrial size wheel rims;
    wherein in step (a), the tractor has a frame size falling within an industry standard large or extra large frame category; and
    wherein in step (b), the set of replacement tires are agricultural replacement tires including two front tires of size 250/85D16.5.

2. A method of replacing a tire system on a compact tractor, said tractor being designed for use selectively with standard industrial size tires on standard industrial size wheel rims, standard agricultural size tires on standard a agricultural size wheel rims and standard turf size tires on standard turf size wheel rims, at least some of said standard agricultural size wheel rims and said standard turf size wheel rims being different in size from said standard industrial size wheel rims, and at least some of said standard agricultural size tires and said standard turf size tires having rolling circumferences different from said standard industrial size tires, said method comprising:
    (a) providing a compact tractor equipped with a set of two front and two rear standard industrial size tires mounted on two front and two rear standard industrial size wheel rims;
    (b) providing a set of replacement tires sized to fit on standard industrial size wheel rims, said set of replacement tires selected from the group consisting of replacement agricultural tires and replacement turf tires, said replacement agricultural tires having rolling circumferences substantially equal to the rolling circumferences of the standard agricultural size tires, and said replacement turf tires having rolling circumferences substantially equal to the rolling circumferences of the standard turf size tires;
    (c) removing at least the two front standard industrial size tires from the two front standard industrial size wheel rims; and
    (d) mounting at least the two front replacement agricultural or turf tires on the two front standard industrial size wheel rims, thereby converting the tractor from industrial tires to agricultural or turf tires without replacing the two front standard industrial size wheel rims;
    wherein in step (a), the tractor has a frame size falling within an industry standard large or extra large frame category; and
    wherein in step (b), the set of replacement tires are turf replacement tires including two front tires of size 265/55D16.5 or 320/55D16.5 and two rear tires of size 460/60D24.

3. A method of replacing a tire system on a compact tractor, said tractor being designed for use selectively with standard industrial size tires on standard industrial size wheel rims, standard a agricultural size tires on standard agricultural size wheel rims and standard turf size tires on standard turf size wheel rims, at least some of said standard agricultural size wheel rims and said standard turf size wheel rims being different in size from said standard industrial size wheel rims, and at least some of said standard agricultural size tires and said standard turf size tires having rolling circumferences different from said standard industrial size tires, said method comprising:
    (a) providing a compact tractor equipped with a set of two front and two rear standard industrial size tires mounted on two front and two rear standard industrial size wheel rims;
    (b) providing a set of replacement tires sized to fit on standard industrial size wheel rims, said set of replacement tires selected from the group consisting of replacement agricultural tires and replacement turf tires, said replacement agricultural tires having rolling circumferences substantially equal to the rolling circumferences of the standard agricultural size tires, and said replacement turf tires having rolling circumferences substantially equal to the rolling circumferences of the standard turf size tires;

(c) removing at least the two front standard industrial size tires from the two front standard industrial size wheel rims; and (d) mounting at least the two front replacement agricultural or turf tires on the two front standard industrial size wheel rims, thereby converting the tractor from industrial tires to agricultural or turf tires without replacing the two front standard industrial size wheel rims;

wherein in step (a), the tractor has a frame size falling within an industry standard mid frame category; and wherein in step (b), the replacement tires are agricultural replacement tires including two front tires of size 200/85D14.

4. A method of replacing a tire system on a compact tractor, said tractor being designed for use selectively with standard industrial size tires on standard industrial size wheel rims, standard agricultural size tires on standard agricultural size wheel rims and standard turf size tires on standard turf size wheel rims, at least some of said standard agricultural size wheel rims and said standard turf size wheel rims being different in size from said standard industrial size wheel rims, and at least some of said standard agricultural size tires and said standard turf size tires having rolling circumferences different from said standard industrial size tires, said method comprising:

(a) providing a compact tractor equipped with a set of two front and two rear standard industrial size tires mounted on two front and two rear standard industrial size wheel rims;

(b) providing a set of replacement tires sized to fit on standard industrial size wheel rims, said set of replacement tires selected from the group consisting of replacement agricultural tires and replacement turf tires, said replacement agricultural tires having rolling circumferences substantially equal to the rolling circumferences of the standard agricultural size tires, and said replacement turf tires having rolling circumferences substantially equal to the rolling circumferences of the standard turf size tires;

(c) removing at least the two front standard industrial size tires from the two front standard industrial size wheel rims; and (d) mounting at least the two front replacement agricultural or turf tires on the two front standard industrial size wheel rims, thereby converting the tractor from industrial tires to agricultural or turf tires without replacing the two front standard industrial size wheel rims;

wherein in step (a), the tractor has a frame size falling within an industry standard mid frame category; and wherein in step (b), the set of replacement tires are turf replacement tires including two front tires of size 215/65D14 and two rear tires of size 380/70D19.5.

5. A set of replacement agricultural tires for a compact tractor, said tractor being designed for use with standard industrial size tires on standard industrial size wheel rims and standard agricultural size tires on standard agricultural size wheel rims, at least some of said standard agricultural size wheel rims being different in size from said standard industrial size wheel rims, and at least some of said standard agricultural size tires having rolling circumferences different from said standard industrial size tires, comprising:

two front replacement agricultural tires and two rear replacement agricultural tires, said replacement tires having rolling circumferences substantially equal to the rolling circumferences of the standard agricultural size tires, at least said two front replacement tires being sized to fit on standard industrial size wheel rims, wherein the front tires are of size 250/85D16.5.

6. A set of replacement agricultural tires for a compact tractor, said tractor being designed for use with standard industrial size tires on standard industrial size wheel rims and standard agricultural size tires on standard agricultural size wheel rims, at least some of said standard agricultural size wheel rims being different in size from said standard industrial size wheel rims, and at least some of said standard agricultural size tires having rolling circumferences different from said standard industrial size tires, comprising:

two front replacement agricultural tires and two rear replacement agricultural tires, said replacement tires having rolling circumferences substantially equal to the rolling circumferences of the standard agricultural size tires, at least said two front replacement tires being sized to fit on standard industrial size wheel rims, wherein the front tires are of size 200/85D14.

7. A set of replacement turf tires for a compact tractor, said tractor being designed for use with standard industrial size tires on standard industrial size wheel rims and standard turf size tires on standard turf size wheel rims, at least some of said standard turf size wheel rims being different in size from said standard industrial size wheel rims, and at least some of said standard turf size tires having rolling circumferences different from said standard industrial size tires, comprising:

two front replacement turf tires and two rear replacement turf tires, said replacement tires having rolling circumferences substantially equal to the rolling circumferences of the standard turf size tires, at least said two front replacement tires being sized to fit on standard industrial size wheel rims, wherein the front tires are of size 265/55D16.5 or 320/55D16.5 and the rear tires are of size 460/60D24.

8. A set of replacement turf tires for a compact tractor, said tractor being designed for use with standard industrial size tires on standard industrial size wheel rims and standard turf size tires on standard turf size wheel rims, at least some of said standard turf size wheel rims being different in size from said standard industrial size wheel rims, and at least some of said standard turf size tires having rolling circumferences different from said standard industrial size tires, comprising:

two front replacement turf tires and two rear replacement turf tires, said replacement tires having rolling circumferences substantially equal to the rolling circumferences of the standard turf size tires, at least said two front replacement tires being sized to fit on standard industrial size wheel rims, wherein the front tires are of size 215/65D14 and the rear tires are of size 380/70D19.5.

\* \* \* \* \*